United States Patent [19]

Dudley, Jr.

[11] Patent Number: 5,028,085
[45] Date of Patent: Jul. 2, 1991

[54] BALE HANDLING IMPLEMENT

[76] Inventor: J. R. Dudley, Jr., P.O. Box 55, Scooba, Miss. 39358

[21] Appl. No.: 511,104

[22] Filed: Apr. 19, 1990

[51] Int. Cl.⁵ .......................... A01D 87/12; B66C 3/16
[52] U.S. Cl. ..................................... 294/107; 294/88; 414/24.5; 414/739
[58] Field of Search ....................... 294/61, 67.3–67.32, 294/63.1, 81.52, 88, 90, 105–109, 120; 414/24.5, 24.6, 620, 621, 729, 739, 911, 920

[56] References Cited

U.S. PATENT DOCUMENTS

| | | | |
|---|---|---|---|
| 2,605,919 | 8/1952 | Shattuck | 414/739 |
| 2,611,498 | 9/1952 | Broersma | 414/739 X |
| 2,620,935 | 12/1952 | Christiansen | 294/107 X |
| 2,676,837 | 4/1954 | Wagner et al. | 294/107 X |
| 2,832,634 | 4/1958 | Bergerson | 294/109 |
| 3,048,288 | 8/1962 | Dwyer | 414/739 X |
| 3,241,695 | 3/1966 | Bishop | 294/107 X |
| 3,410,431 | 11/1968 | Vik | 294/88 X |
| 3,420,564 | 1/1969 | Jensen | 294/107 X |
| 3,427,640 | 2/1969 | Clatterbuck | 294/106 X |
| 3,944,274 | 3/1976 | Mott et al. | 294/107 X |
| 4,071,155 | 1/1978 | Hart et al. | 294/88 X |
| 4,073,532 | 2/1978 | Blair | 294/107 |
| 4,161,253 | 7/1979 | Ralston et al. | 414/24.6 |
| 4,525,121 | 6/1985 | Cawley | 294/107 X |
| 4,583,900 | 4/1986 | Cooley | 414/24.5 |
| 4,722,651 | 2/1988 | Antal | 414/24.5 |

FOREIGN PATENT DOCUMENTS

| | | | |
|---|---|---|---|
| 2525152 | 12/1976 | Fed. Rep. of Germany | 294/107 |
| 2367696 | 12/1978 | France | 294/107 |
| 2191991 | 12/1987 | United Kingdom | 294/107 |

Primary Examiner—Johnny D. Cherry
Attorney, Agent, or Firm—Bacon & Thomas

[57] ABSTRACT

A bale handling implement is disclosed having a pair of elongated arm members rotatably attached to a mounting support such that the arms are rotatable about their longitudinal axes. The arms, which have several teeth extending from one side, rotatably pass through a support bushing that is directly attached to the mounting support. The elongated arms are rotated by a single, fluid actuated power cylinder attached to the mounting support between a position in which the teeth extend generally downwardly and a position in which the teeth engage the hay bale to facilitate its lifting. A linkage mechanism interconnects the actuating rod of the fluid actuated power cylinder to crank arms attached to the elongated arm members such that extension and retraction of the actuating rod causes the arm members to rotate about their longitudinal axes.

4 Claims, 2 Drawing Sheets

BALE HANDLING IMPLEMENT

BACKGROUND OF THE INVENTION

The present invention relates to a bale handling implement, specifically such an implement that is attachable to a lifting vehicle to lift and manipulate hay bales.

Modern farming operations have increasingly turned to the use of large, round hay bales due to the efficiency associated with these units. Such hay bales are generally cylindrical in shape with a diameter and length approaching 5 feet and a weight of approximately 1,500 pounds. The size and weight of these hay bales prohibits their handling by manual manipulation and has dictated the need for machinery capable of lifting and moving such hay bales.

Such known apparatus for handling round hay bales typically include lifting forks, clamps or spindling devices all of which tend to be inefficient and/or expensive to fabricate and maintain. Several devices have been proposed which use lifting arms that are insertable along either side of a lower portion of the bale, which arms may be then pivoted into contact with the bale and lifted by attachment of the device to a tractor, front-end loader, or a similar vehicle. Such known lifting arm devices are operated by a complex and inherently unreliable mechanical linkage system, or by an actuating cylinder interposed between pivoting links to which the lifting arms are mounted. Although this latter mechanism has been simplified from the complex mechanical actuating linkage, the weight of the bales on the lifting arms imposes concentrated stress loads on the links and their pivoting attachment to the implement support. This inherently reduces the reliability of such a system.

SUMMARY OF THE INVENTION

A bale handling implement is disclosed having a pair of elongated arm members rotatably attached to a mounting support such that the arms are rotatable about their longitudinal axes. The arms, which have several teeth extending from one side, rotatably pass through a support bushing that is directly attached to the mounting support. The loads imposed on the elongated arms during the lifting of the hay bale are, thus, transferred directly to the mounting support through the support bushings.

The elongated arms are rotated by a single, fluid actuated power cylinder attached to the mounting support between a position in which the teeth extend generally downwardly, thereby enabling the arms to be inserted alongside the flat sides of the cylindrical hay bale, to a position which the teeth engage the sides of the hay bale to facilitate its lifting. A linkage mechanism interconnects the actuating rod of the fluid actuated power cylinder to crank arms attached to the elongated arm members such that extension and retraction of the actuating rod causes the arm members to rotate about their longitudinal axes.

The mounting support can be easily attached to a tractor, a front-end loader, or similar vehicle having the capability of lifting and maneuvering the hay bale.

DESCRIPTION OF THE PREFERRED EMBODIMENT

Figure 1:
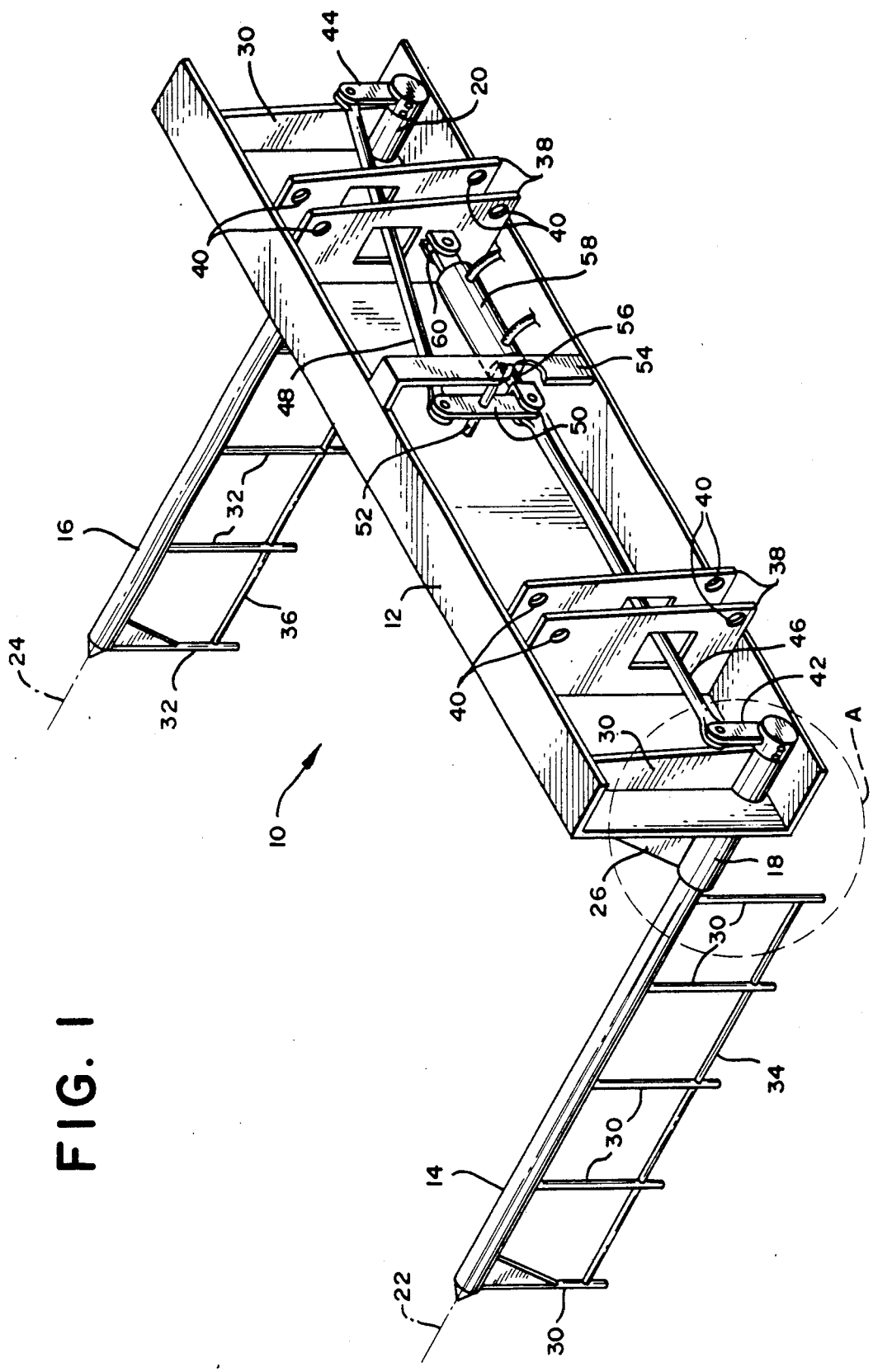
FIG. 1 is a perspective view of the hay bale handling implement according to the present invention.

The bale handling implement 10, as illustrated in FIG. 1, comprises a mounting support member 12 which may have a generally "C" shaped cross-section. The mounting support member 12 may be fabricated from ⅜ inch thick steel having a height of approximately 18 inches, a bottom flange width of approximately 6 inches and an upper flange width of approximately 4 inches. Quite obviously, other materials having other dimensions may be utilized without exceeding the scope of this invention.

A plurality of elongated arm members 14 and 16 are rotatably supported on the mounting support member 12 by support bushings 18 and 20, respectively. Bushings 18 and are generally hollow, cylindrical members which are fixedly attached to the mounting support member 12. Elongated arm members 14 and 16 extend through the support bushings 18 and 20 such that they are rotatable about their longitudinal axes 22 and 24. Gussets 26, 28 and 30 may be welded between the mounting support member 12 and the respective support bushings 18 and 20 to provide sufficient strength for lifting and manipulating the hay bale.

It has been found that fabricating the gussets from steel having an approximate thickness of ¼ inches provides the requisite strength, as does fabricating the elongated arm members 14 and 16 from triple strength pipe having a three inch outside diameter. Again, other materials may be substituted without exceeding the scope of this invention.

A plurality of teeth 30 and 32 extend from each of the elongated arm members 14 and 16, respectively. The teeth 30 and 32 extend from the same side of each of the arms 14 and 16 and may be interconnected adjacent their distal ends by reinforcing members 34 and 36, respectively.

The mounting support member 12 may also incorporate mounting brackets 38 which are welded to the mounting support member 12 and define openings 40 to facilitate the attachment of the implement to a farm tractor, front-end loader, or a similar vehicle.

The elongated arm members 14 and 16 have crank arms 42 and 44 attached to end portions extending through the respective support bushings 18 and 20.

The crank arms may be fabricated from steel plate by forming a hole in the plate of sufficient size to accommodate end cap 43. The crank arm is then welded to the end cap around the opening and the end cap is attached to the respective elongated arm member by bolts 45 or the like.

The crank arm 42 is pivotally attached to one end of a first link rod 46, while crank arm 44 is pivotally attached to one end of a second link rod 48. The opposite ends of first and second link rods 46 and 48 are pivotally attached to an actuating member 50 which is, in turn, pivotally supported on the mounting support member 12 by rod 52. Rod 52 extends between the front wall of the mounting support member 12 and a pivot shaft support member 54. Member 54 may be attached to the mounting support member 12 by welding or the like. As illustrated in FIG. 1, the link rods 46 and 48 are pivotally attached to the actuating member 50 on opposite sides of the pivot shaft 52. The crank arms 42 and 44, the actuating member 50, and the first and second link rods 46 and 48 are generally co-planar, which plane extends generally perpendicular to the longitudinal axes 22 and 24 of the elongated arm members 14 and 16.

Actuating member 50 is also connected to a distal end of an actuating rod 56 which is a part of fluid power cylinder 58. Fluid power cylinder 58 may be connected, in known fashion, to a source of fluid power, such as the hydraulic power circuit of the tractor, front end loader or the like such that the actuating rod 56 is extendible and retractable with respect to the cylinder 58. Cylinder 58 is attached to a mounting bracket 38 via a clevis 60, or the like such that the cylinder may pivot about its connecting point, but may not undergo any translational movement.

Figure 2:
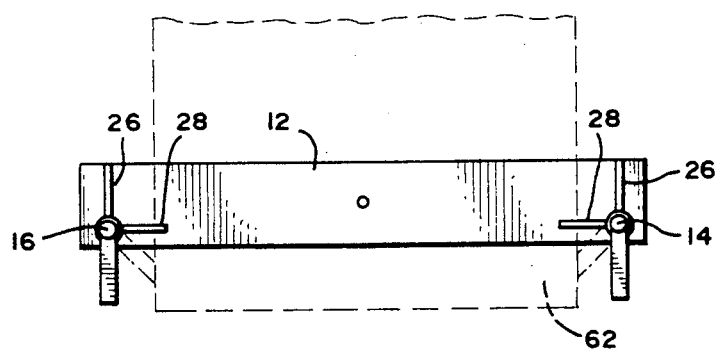
FIG. 2 is a front view of the implement illustrated in FIG. 1.

As can be seen in FIG. 2, the elongated arm members 14 and 16 are rotated about their longitudinal axes 22 and 24 as the actuating rod 56 is extended from or retracted into the power cylinder 58 The arms are pivoted between an open position wherein the teeth 30 and 32 extend generally downwardly, and a clamping position, illustrated in dashed lines in FIG. 2, in which the teeth 30 and 32 bear against the sides 62a and 62b of the hay bale 62.

Figure 4:
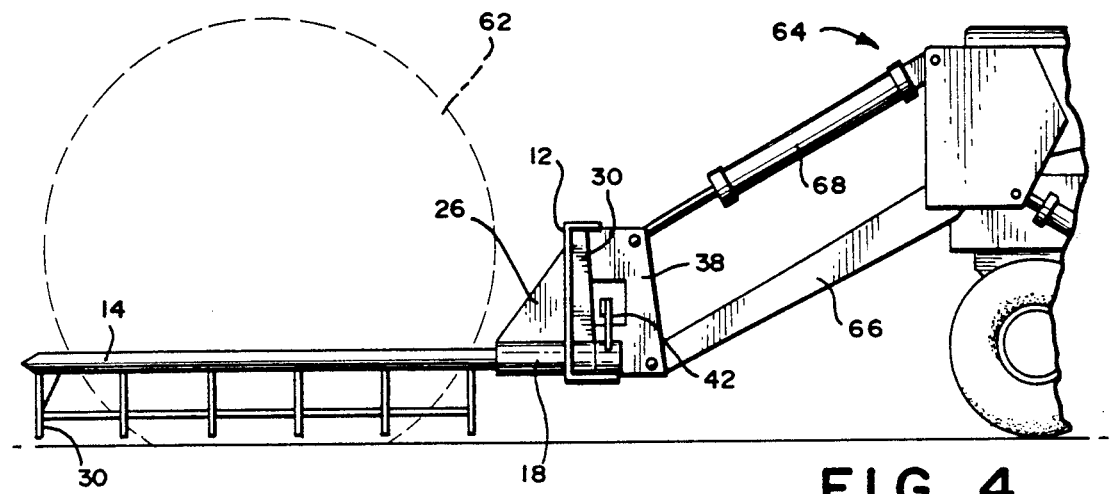
FIG. 4 is a side view of the implement of FIG. 1 attached to a farm vehicle and inserted alongside a hay bale.

In FIG. 4, the bale handling implement 10 is shown attached to a front-end loader-type vehicle 64 having lifting arms 66 and a lifting cylinder 68 attached to the brackets 38. The actuating rod 56 is positioned so that the teeth 30 and 32 are in their opened positions, as indicated in FIG. 2. The vehicle 64 is positioned such that the elongated arms 14 and 16 extend along the flat sides of the cylindrical hay bale 62. The fluid power cylinder 58 is then actuated such that the actuating rod and the intervening linkage rotates the elongated arm members 14 and 16 such that the teeth 30 and 32 contact the hay bale 62. The teeth 30 and 32 engage the hay bale 62 at a plurality of points so as to distribute the load and to prevent undue deformation of the hay bale 62. Since the hay bale is clamped between the arm members, it may be lifted, tilted and otherwise manipulated without falling off the bale handling implement. The narrow arm members enable the bales to be stacked closely together. The only space necessary between adjacent bales is that sufficient to accommodate the width of the arm members.

Figure 3:
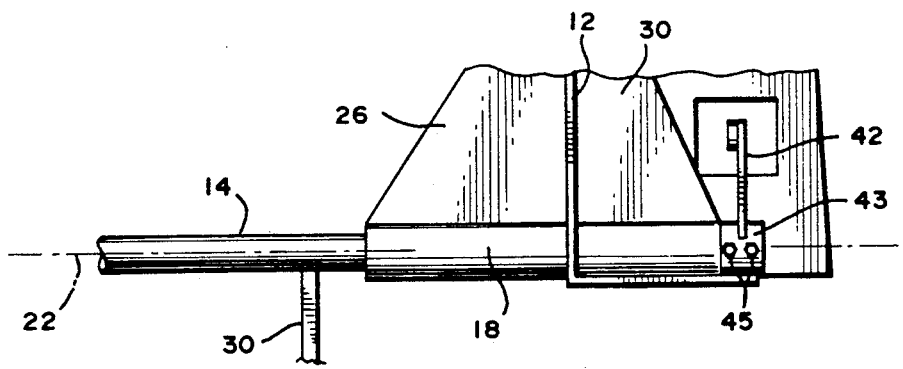
FIG. 3 is an enlarged, side view of the area indicated at A in FIG. 1.

The loads imposed upon the elongated arm members 14 and 16 are also distributed over a relatively large area by the contact between the elongated arm members and the support bushings 18 and 20, which are, in turn, rigidly attached to the mounting support member 12 as shown in detail in FIG. 3. The rigidness of the assembly enables the use of a smaller fluid power cylinder than on known prior art devices, since the forces of the lifting of the hay bale 62 are not directly applied to the fluid power cylinder or the actuating linkage, but are born by the arms, the support bushings and the support member. Furthermore, the relative dimensions of the crank arms 42 and 44 as well as the connecting points of the link rods to the actuating member 50 may be varied to increase the force exerted by the actuating rod 56 on the elongated arm members 14 and 16. Adjustment of these dimensions to a particular implement may also minimize the length of travel required by the extension and contraction of the actuating rod 56.

The foregoing description is provided for illustrative purposes only and should not be construed as in any way limiting this invention, the scope of which is defined solely by the appended claims.

I claim:

1. A bale handling implement comprising:
    a) a mounting support member;
    b) a pair of elongated arm members having longitudinal axes;
    c) attaching means attaching the pair of elongated arm member to the mounting support member such that they are cantilevered and such that they may undergo only rotational movement about their longitudinal axes with respect to the mounting support member;
    d) a fluid power cylinder having an extendible and retractable actuating rod, the cylinder being attached to the mounting support member; and
    e) linkage means interconnecting the actuating rod to the pair of elongated arm members such that extension and retraction of the actuating rod causes the elongated arm members to rotate about their longitudinal axes wherein the linkage means comprises:
        i) a crank arm operatively associated with each elongated arm member;
        ii) an actuating member pivotally attached to the mounting support member and operatively associated with the actuating rod such that the actuating member is caused to pivot about a pivot axis as the actuating rod is extended or retracted;
        iii) a first link rod connecting the actuating member and a crank arm; and,
        iv) a second link rod connecting the actuating member and the other crank arm.

2. The bale handling implement according to claim 1 wherein the attaching means comprises a support bushing fixedly attached to the mounting support member and rotatably supporting an elongated arm member.

3. The bale handling implement according to claim 1 wherein the crank arms, the actuating member, the first link rod and the second link rod are generally co-planar, which plane extends generally perpendicular to the longitudinal axes of the elongated arm members.

4. The bale handling implement according to claim 3 wherein the first and second link rods are connected to the actuating member on opposite sides of the its pivot axis.

* * * * *